US008650649B1

(12) United States Patent
Chen et al.

(10) Patent No.: US 8,650,649 B1
(45) Date of Patent: Feb. 11, 2014

(54) SYSTEMS AND METHODS FOR DETERMINING WHETHER TO EVALUATE THE TRUSTWORTHINESS OF DIGITALLY SIGNED FILES BASED ON SIGNER REPUTATION

(75) Inventors: Joseph H. Chen, Los Angeles, CA (US); Brendon V Woirhaye, North Whittier, CA (US)

(73) Assignee: Symantec Corporation, Mountain View, CA (US)

(*) Notice: Subject to any disclaimer, the term of this patent is extended or adjusted under 35 U.S.C. 154(b) by 61 days.

(21) Appl. No.: 13/214,514

(22) Filed: Aug. 22, 2011

(51) Int. Cl.
G06F 7/04 (2006.01)

(52) U.S. Cl.
USPC .................. 726/24; 726/22; 726/23; 726/25

(58) Field of Classification Search
None
See application file for complete search history.

(56) References Cited

U.S. PATENT DOCUMENTS

| | | | |
|---|---|---|---|
| 6,901,518 B1 * | 5/2005 | Scheifler et al. | 726/12 |
| 7,085,925 B2 * | 8/2006 | Hanna et al. | 713/157 |
| 7,822,620 B2 * | 10/2010 | Dixon et al. | 705/1.1 |
| 8,037,536 B2 * | 10/2011 | Treadwell et al. | 726/25 |
| 8,219,620 B2 * | 7/2012 | Hart | 709/206 |
| 2004/0015726 A1 * | 1/2004 | Szor | 713/201 |
| 2005/0131583 A1 * | 6/2005 | Ransom | 700/295 |
| 2007/0033168 A1 * | 2/2007 | Minogue et al. | 707/3 |
| 2007/0079379 A1 * | 4/2007 | Sprosts et al. | 726/24 |
| 2007/0083929 A1 * | 4/2007 | Sprosts et al. | 726/22 |
| 2007/0107059 A1 * | 5/2007 | Chasin et al. | 726/23 |
| 2007/0152854 A1 * | 7/2007 | Copley | 341/51 |
| 2011/0047597 A1 * | 2/2011 | Mahaffey et al. | 726/3 |

OTHER PUBLICATIONS

Symantec (Nachenberg et al., "An analysis of real-world effectiveness of reputation-based security", Oct. 2010).*
Bamasak (Bamasak et al., "Reputation management and signature delegation: A distributed approach", Electron Commerce Res (2006) 6:227-263, DOI 10.1007/s10660-006-8675-9).*
Cisco, Cisco IronPort AsyncOS 7.1 for Email Configuration Guide, Apr. 2010.*

* cited by examiner

Primary Examiner — Peter Poltorak
(74) Attorney, Agent, or Firm — ALG Intellectual Property, LLC (57) ABSTRACT

A computer-implemented method for determining whether to evaluate the trustworthiness of digitally signed files based on signer reputation may include (1) identifying a file, (2) determining that the file has been digitally signed, (3) identifying a signer responsible for digitally signing the file, (4) identifying the signer's reputation, and then (5) determining whether to evaluate the trustworthiness of the file based at least in part on the signer's reputation. In one example, the signer's reputation may be based at least in part on the determined trustworthiness of at least one additional file that was previously signed by the signer. Various other methods, systems, and encoded computer-readable media are also disclosed.

19 Claims, 7 Drawing Sheets

Reputation Information
502

\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Signer=ExampleCorp., Inc.
Website=www.examplecorp.com
Publisher_Reputation=99%
EmailAddress=info@examplecorp.org
Public Key Info:
   Public Key Algorithm: rsaEncryption
   RSA Public Key: 1024_bit
   Modulus (1024_bit):
     00:b4:31:98:0a:c4:bc:62:c1:88:aa:dc:b0:c8:bb:
     33:35:19:d5:0c:64:b9:3d:41:b2:96:fc:f3:31:e1:
     66:36:d0:8e:56:12:44:ba:75:eb:e8:1c:9c:5b:66:
     70:33:52:14:c9:ec:4f:91:51:70:39:de:53:85:17:
     16:94:6e:ee:f4:d5:6f:d5:ca:b3:47:5e:1b:0c:7b:
     c5:cc:2b:6b:c1:90:c3:16:31:0d:bf:7a:c7:47:77:
     8f:a0:21:c7:4c:d0:16:65:00:c1:0f:d7:b8:80:e3:
     d2:75:6b:c1:ea:9e:5c:5c:ea:7d:c1:a1:10:bc:b8:
     e8:35:1c:9e:27:52:7e:41:8f
   Exponent: 65537 (0x10001)
   Signature Algorithm: md5WithRSAEncryption
     93:5f:8f:5f:c5:af:bf:0a:ab:a5:6d:fb:24:5f:b6:59:5d:9d:
     92:2e:4a:1b:8b:ac:7d:99:17:5d:cd:19:f6:ad:ef:63:2f:92:
     ab:2f:4b:cf:0a:13:90:ee:2c:0e:43:03:be:f6:ea:8e:9c:67:
     d0:a2:40:03:f7:ef:6a:15:09:79:a9:46:ed:b7:16:1b:41:72:
     0d:19:aa:ad:dd:9a:df:ab:97:50:65:f5:5e:85:a6:ef:19:d1:
     5a:de:9d:ea:63:cd:cb:cc:6d:5d:01:85:b5:6d:c8:f3:d9:f7:
     8f:0e:fc:ba:1f:34:e9:96:6e:6c:cf:f2:ef:9b:bf:de:b5:22:

SYSTEMS AND METHODS FOR DETERMINING WHETHER TO EVALUATE THE TRUSTWORTHINESS OF DIGITALLY SIGNED FILES BASED ON SIGNER REPUTATION

BACKGROUND

Many software publishers digitally "sign" files or applications created or published by the publisher in order to demonstrate the authenticity of such files and applications. For example, a software publisher may encrypt the hash of a file using a public-key cryptographic system in order to demonstrate that the file has been signed by an authoritative party. Valid digital signatures give recipients reason to believe that a digitally signed file was both created by a known sender and has not been altered since leaving the sender's possession.

Computer security software currently typically treat files that have been digitally signed as trusted, allowing such files to be executed or otherwise accessed without first performing an independent evaluation of the trustworthiness of such files (by, e.g., scanning such files for malware, etc.). Unfortunately, digital signing schemes may be compromised in a variety of ways, including by physically obtaining the private key used by an entity to digitally sign a file and/or by tricking an entity into signing a file using various social-engineering attack vectors. In fact, in recent years, at least one security-software publisher has identified a rise in files that have been digitally signed that contain malware, adware, spyware, grayware, or the like.

As such, the instant disclosure identifies a need for improved methods and systems for detecting, blocking, and/or removing malicious and/or untrustworthy files, even if such files have been digitally signed.

SUMMARY

As will be described in greater detail below, the instant disclosure describes various systems and methods for enabling security software to detect, block, and/or remove malicious and/or untrustworthy files, even if such files have been digitally signed. In one example, the systems and methods described herein may accomplish such a task by performing a full trustworthiness evaluation of a digitally signed file (even if the file has been digitally signed) if the reputation of an entity responsible for signing the file suggests or indicates that the signing entity is untrusted or untrustworthy.

For example, a computer-implemented method for determining whether to evaluate the trustworthiness of digitally signed files based on signer reputation may include (1) identifying a file, (2) determining that the file has been digitally signed, (3) identifying a signer responsible for digitally signing the file, (4) identifying a reputation associated with the signer that is based at least in part on the determined trustworthiness of at least one additional file that was previously signed by the signer, and then (5) determining whether to evaluate the trustworthiness of the file based at least in part on the signer's reputation.

In some examples, the signer's reputation may be based at least in part on whether the signer has previously signed a file containing malware and/or whether the signer has previously signed a file having a reputation that fails to satisfy a predetermined threshold. In one embodiment, identifying the signer's reputation may include obtaining the signer's reputation from a reputation server.

In some embodiments, determining whether to evaluate the trustworthiness of the file based at least in part on the signer's reputation may include determining whether the signer's reputation indicates that the signer is trusted and/or determining whether the signer's reputation satisfies a predetermined threshold. Determining whether to evaluate the trustworthiness of the file based at least in part on the signer's reputation may also include determining, based at least in part on the signer's reputation, (1) that an evaluation of the trustworthiness of the file is necessary or (2) that an evaluation of the trustworthiness of the file is unnecessary. The method may also include evaluating the trustworthiness of the file upon determining that an evaluation of the trustworthiness of the file is necessary. In some examples, all or a portion of the above-described method may be performed by a server-side computing device and/or a client-side computing device.

In one embodiment, a system for implementing the above-described method may include a file-analysis module programmed to (1) identify a file, (2) determine that the file has been digitally signed, and (3) identify a signer responsible for digitally signing the file. The system may also include a reputation module programmed to identify a reputation of the signer that is based at least in part on the determined trustworthiness of at least one additional file that was previously signed by the signer. In addition, the system may include a security module programmed to determine whether to evaluate the trustworthiness of the file based at least in part on the signer's reputation. In one example, at least one processor within the system may be configured to execute the file-analysis module, the reputation module, and/or the security module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a file, (2) determine that the file has been digitally signed, (3) identify a signer responsible for digitally signing the file, (4) identify a reputation of the signer that is based at least in part on the determined trustworthiness of at least one additional file that was previously signed by the signer, and then (5) determine whether to evaluate the trustworthiness of the file based at least in part on the signer's reputation.

As will be explained in greater detail below, by determining whether to evaluate the trustworthiness of a digitally signed file based at least in part on the reputation of the signer responsible for signing such a file, the systems and methods described herein may enable security software to detect, block, and/or remove malicious and/or untrustworthy files, even if such files have been digitally signed. As such, the systems and methods described herein may enable security-software publishers to protect enterprises and end users against attacks that seek to exploit and/or compromise digital signing techniques.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
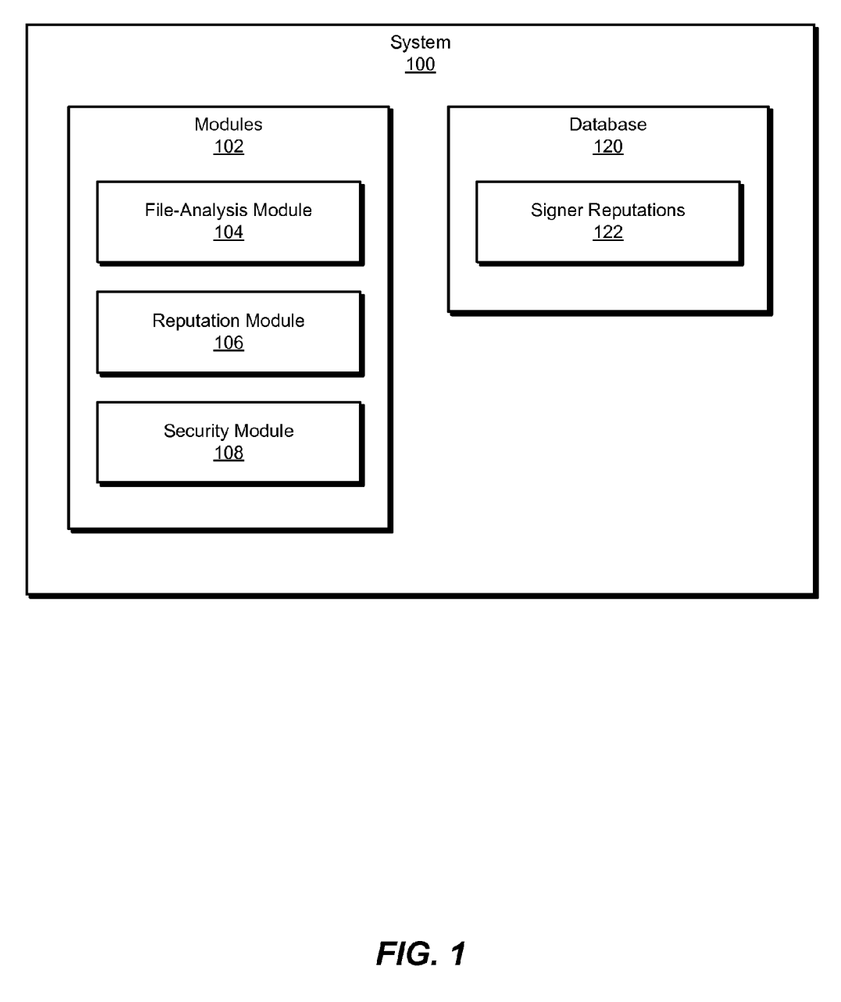
FIG. 1 is a block diagram of an exemplary system for determining whether to evaluate the trustworthiness of digitally signed files based on signer reputation.
Figure 2:
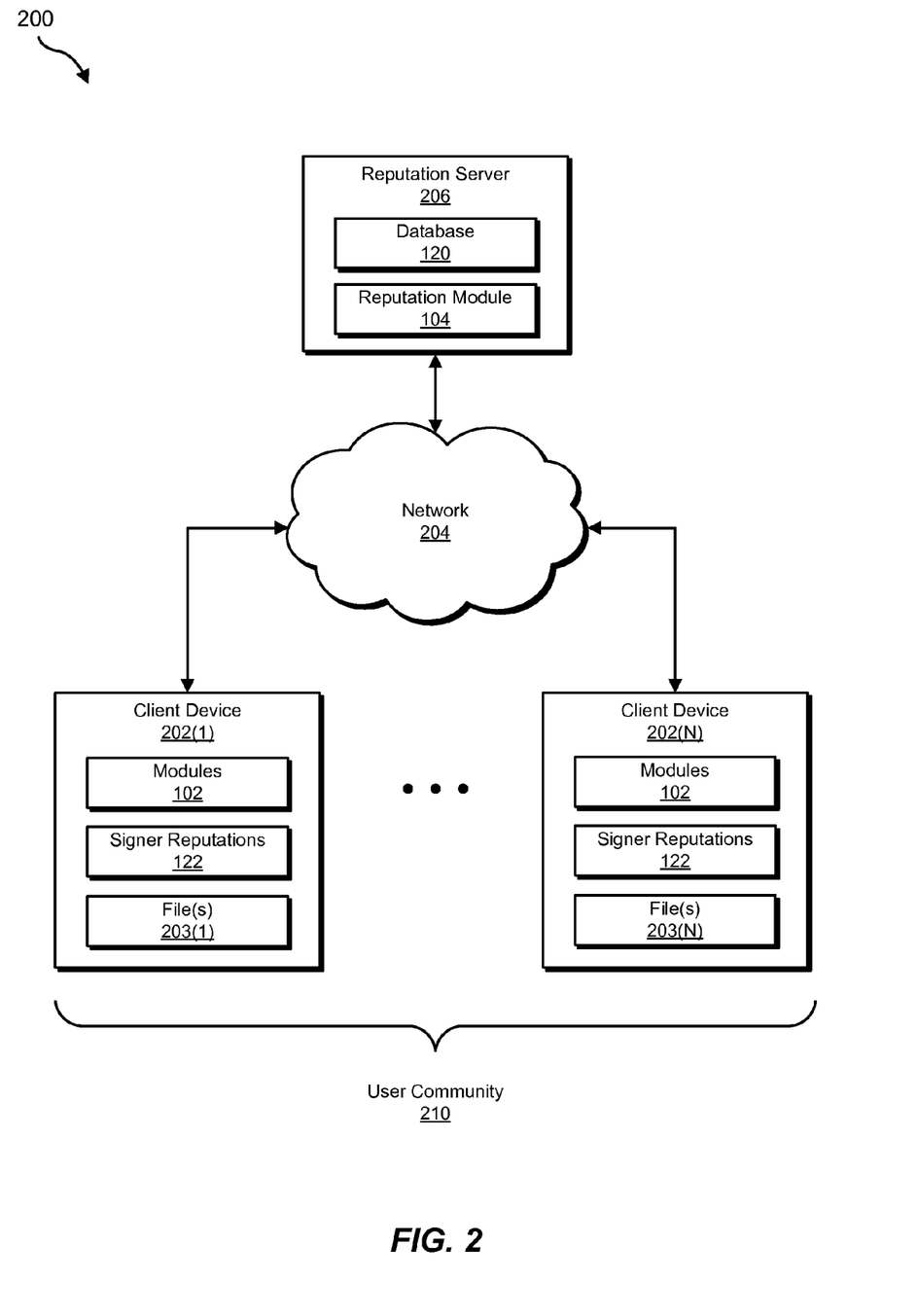
FIG. 2 is a block diagram of an exemplary system for determining whether to evaluate the trustworthiness of digitally signed files based on signer reputation.

The following will provide, with reference to FIGS. 1-2, detailed descriptions of exemplary systems for determining whether to evaluate the trustworthiness of digitally signed files based on signer reputation. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for determining whether to evaluate the trustworthiness of digitally signed files based on signer reputation. As illustrated in this figure, exemplary system 100 may include one or more modules 102 for performing one or more tasks. For example, and as will be explained in greater detail below, exemplary system 100 may include a file-analysis module 104 programmed to (1) identify a file, (2) determine that the file has been digitally signed, and then (3) identify a signer responsible for digitally signing the file. Exemplary system 100 may also include reputation module 106 programmed to identify the reputation of the signer of the file that is based at least in part on the determined trustworthiness of at least one additional file that was previously signed by the signer.

In addition, and as will be described in greater detail below, exemplary system 100 may include a security module 108 programmed to determine whether to evaluate the trustworthiness of the file based at least in part on the signer's reputation. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client devices 202(1)-(N) and/or reputation server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information that identifies the reputations of various signing entities (e.g., signer reputations 122). As will be described in greater detail below, these reputations may be based at least in part on the determined trustworthiness of files that were previously digitally signed by such entities.

Database 120 may represent portions of a single database or computing device or a plurality of databases or computing devices. For example, database 120 may represent a portion of client devices 202(1)-(N) and/or reputation server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as client devices 202(1)-(N) and/or reputation server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a plurality of client devices 202(1)-(N) within a user community 210 in communication with a reputation server 206 via a network 204.

In one embodiment, one or more of modules 102 from FIG. 1 may, when executed by at least one processor of a computing device (such as one or more of client devices 202(1)-(N) in FIG. 2), enable the computing device to determine whether to scan or otherwise evaluate the trustworthiness of digitally signed files based on signer reputation. For example, and as will be described in greater detail below, one or more of modules 102 may cause client device 202(1) to (1) identify a file (e.g., file 203(1)), (2) determine that the file has been digitally signed, (3) identify a signer responsible for digitally signing the file, (4) identify the reputation of the signer that is based at least in part on the determined trustworthiness of at least one additional file that was previously signed by the signer, and then (5) determine whether to evaluate the trustworthiness of the file based at least in part on the signer's reputation.

Client devices 202(1)-(N) generally represent any type or form of computing device capable of reading computer-executable instructions. Examples of client devices 202(1)-(N) include, without limitation, laptops, desktops, servers, cellular phones, personal digital assistants (PDAs), multimedia players, embedded systems, combinations of one or more of the same, exemplary computing system 610 in FIG. 6, or any other suitable computing device. In one example, client devices 202(1)-(N) may represent computing devices within a user community (e.g., user community 210), such as an enterprise or the user base of a security-software vendor.

Reputation server 206 generally represents any type or form of computing subsystem (such as a reputation service) capable of generating and/or receiving information that identifies the reputation of an object or entity, such as a file or the signer of such a file. As will be explained in greater detail below, in some examples reputation server 206 may generate such information by collecting, aggregating, and analyzing data from potentially millions of user devices within a community (such as an enterprise or user base of a security-software vendor).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between client devices 202(1)-(N) and reputation server 206.

Figure 3:
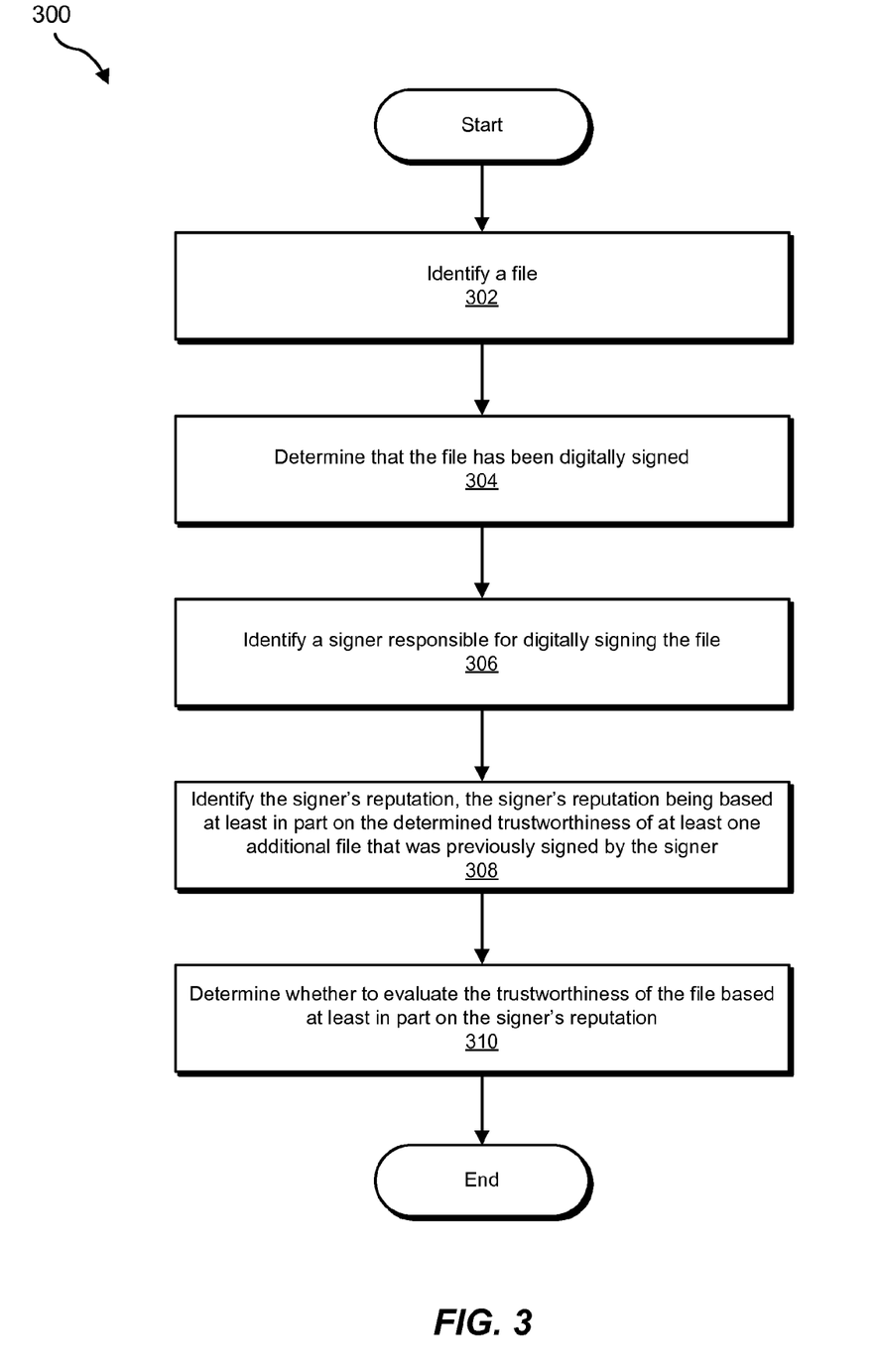
FIG. 3 is a flow diagram of an exemplary method for determining whether to evaluate the trustworthiness of digitally signed files based on signer reputation.
Figure 4:
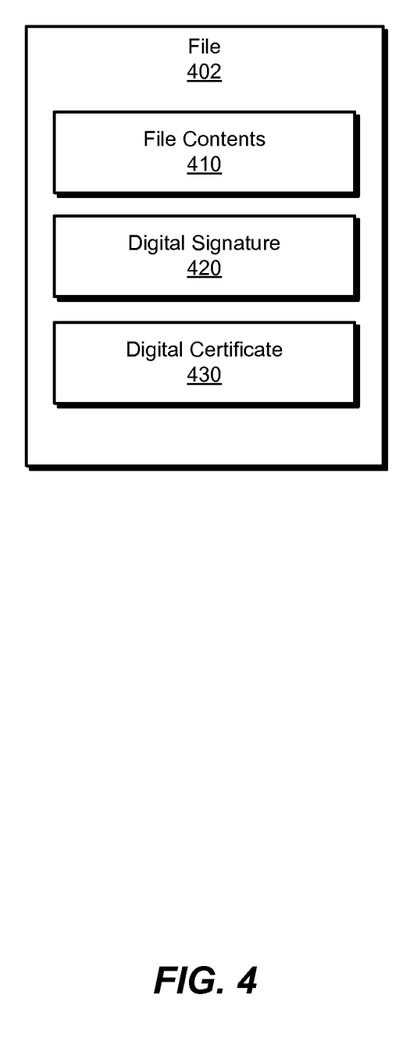
FIG. 4 is a block diagram of an exemplary digitally signed file.

FIG. 3 is a flow diagram of an exemplary computer-implemented method 300 for determining whether to evaluate the trustworthiness of digitally signed files based on signer reputation. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 the systems described herein may identify a file. For example, file-analysis module 104 in FIG. 1 may, as part of client device 202(1) in FIG. 2, identify a file 203(1) encountered by client device 202(1).

As used herein, the term "file" may refer to any data object that may be digitally signed. In some examples, a "file" may refer to an executable file, such as a portable executable file, a native executable file, a library file, a bytecode file executed within an interpreter, a script file, etc.

The systems described herein may identify a file in step 302 in a variety of ways. In one example, the systems described herein may identify a file upon encountering the file. For example, a client-side computing device (such as client device 202(1) in FIG. 2) may identify a file upon identifying an attempt by a user, application, or device to load or store a file onto the client-side computing device, download a file onto the client-side computing device, and/or execute or otherwise access a file stored on the client-side computing device.

Returning to FIG. 3, at step 304 the systems described herein may determine that the file identified in step 302 has been digitally signed. For example, file-analysis module 104 in FIG. 1 may, as part of client device 202(1) in FIG. 2, determine that file 203(1) has been digitally signed.

The systems described herein may determine that the file has been digitally signed step 304 in a variety of ways. In one example, the systems described herein may identify a digital signature included within or appended to the file identified in step 302. For example, file-analysis module 104 may identify a digital signature 420 included with the file 402 illustrated in FIG. 4.

As used herein, the phrase "digital signature" may refer to any code signing scheme and/or other scheme by which an entity may authenticate or validate a file. Accordingly, a "digital signature" may refer to a digital signature (e.g., digital signature 420 in FIG. 4) and/or a digital certificate (e.g., digital certificate 430). In some examples, digital signatures may use public-key cryptography as a mechanism to demonstrate that the executable file has been signed by an authoritative party. A digital signature for an executable file may be embedded within the executable file itself and/or exist as a separate file and/or data structure.

Returning to FIG. 3, at step 306 the systems described herein may identify a signer responsible for digitally signing the file identified in step 302. For example, file-analysis module 104 in FIG. 1 may, as part of client device 202(1) in FIG. 2, identify a signer responsible for digitally signing file 203(1).

The systems described herein may perform step 306 in a variety of ways. In one example, the systems described herein may identify a signer that is responsible for digitally signing the file identified in step 302 by identifying and analyzing a digital signature and/or digital certificate included within or appended to the file identified in step 302. For example, file-analysis module 104 may identify a signer responsible for digitally signing file 402 in FIG. 4 by parsing digital signature 420 and/or digital certificate 430 in FIG. 4.

Returning to FIG. 3, at step 308 the systems described herein may identify the reputation of the signer identified in step 306. For example, reputation module 106 in FIG. 1 may, as part of client device 202(1) in FIG. 2, identify the reputation of the signer that digitally signed file 203(1).

The term "reputation," as used herein, may refer to information that conveys the opinion of a specific community (such as the user base of a security-software publisher) on the trustworthiness or legitimacy of an object or entity, such as an executable file or a publisher or signer of such a file. The phrase "signer reputation," therefore, may refer to information that conveys the opinion of such a community on the trustworthiness or legitimacy of an entity responsible for digitally signing a file.

The reputation of an object or entity may be conveyed in a variety of ways; including, for example, through the use of reputation scores (where, for example, high reputation scores indicate that an object or entity, such as a file or the signer of a file, is generally trusted within a community and low reputation scores indicate that an object or entity is generally untrusted within a community), reputation designations (e.g., "trusted" or "untrusted"), prevalence information (e.g., information that identifies the number or percentage of user devices within a community that contain (1) an instance of a particular file and/or (2) files signed by a particular signer), or any other information that may be used to identify a community's opinion on the trustworthiness or legitimacy of an object or entity.

Figure 5:
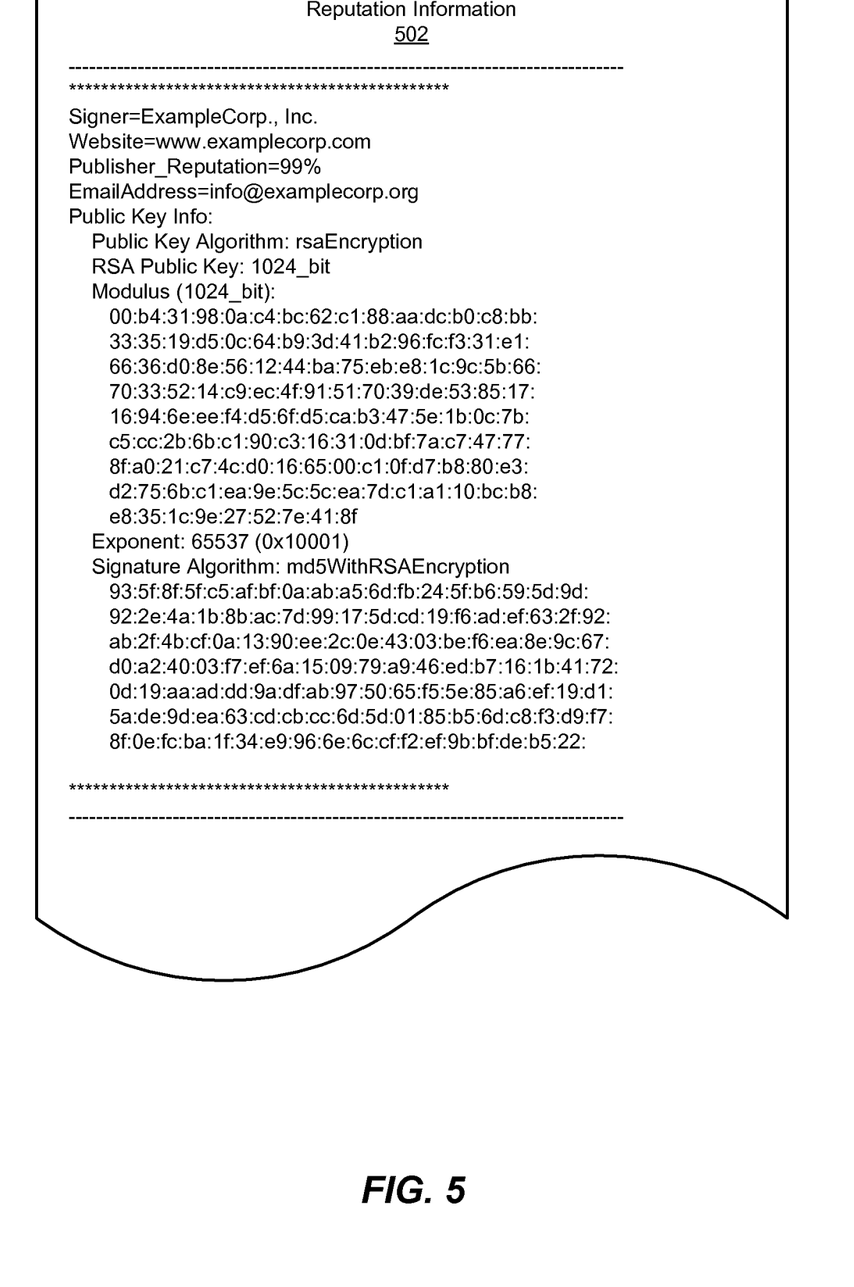
FIG. 5 is an illustration of exemplary reputation information for a signer.

The systems described herein may identify the reputation of a signer in a variety of ways. In one example, the systems described herein may obtain information that identifies a signer's reputation from a reputation service. For example, reputation module 106 in FIG. 1 may, as part of client device 202(1) in FIG. 2, obtain reputation information 502 in FIG. 5 for the signer identified in step 306 from reputation server 206. As illustrated in FIG. 5, reputation information 502 may include information that uniquely identifies the signer in question (e.g., a common and/or distinguished name associated with the signer, a website and/or email address associated with the signer, and/or a public key associated with the signer). Reputation information 502 may also include information that identifies the reputation of the signer, such as a reputation score for the signer ("99%", in this example) and/ or a reputation designation for the signer (e.g., "trusted"). In this example, the signer's high reputation score ("99%") may indicate that the signer is generally regarded as trustworthy and/or legitimate.

In one example, a reputation service (such as reputation server 206 in FIG. 2) may derive or assign a signer's reputation based at least in part on the determined trustworthiness of at least one file that was previously signed by the signer in question. For example, a reputation service may derive a reputation for a particular signer by (1) identifying at least one file that was previously signed by the signer in question, (2) determining the trustworthiness of such files, and then (3) deriving a reputation for the signer in question based at least in part of the trustworthiness of such files previously signed by the signer.

Reputation services, such as reputation server 206 in FIG. 2, may identify files that were previously signed by a signer in a variety of ways. In one example, a reputation service may obtain information that identifies files that were previously signed by a particular signer from a certificate authority. In another example, a reputation service may identify files that were previously signed by a particular signer by collecting, aggregating, and analyzing data from user devices within a community (such as the user base of a security-software publisher). For example, reputation server 206 in FIG. 2 may obtain information from client devices within user community 210 that uniquely identifies digitally signed files encountered by client devices within user community 210 and/or information that identify the signers responsible for digitally signing such files.

Reputation server 206 may determine the trustworthiness of files that were previously signed by a particular signer in a variety of ways. In one example, reputation server 206 may evaluate the trustworthiness of such files using various malware-detection and/or classification techniques that detect malware, adware, spyware, and/or grayware using various heuristics and/or signature-detection methods. Additionally or alternatively, reputation server 206 may obtain the results of such evaluations performed by a security server and/or by individual security components installed on client devices within user community 210.

In one example, the trustworthiness of a file may be represented using simple binary classifications, such as "trusted" or "untrusted." In other examples, the trustworthiness of a file may be represented using reputation scores (where, for example, a high reputation score indicates that a file is generally trusted within a community and a low reputation score indicates that a file is generally untrusted within a community). In some examples, reputation services (such as reputation server 206 in FIG. 2) may generate reputation scores for files by collecting, aggregating, and analyzing data from client devices within a community (such as the user base of a security-software publisher). Examples of data gathered from client devices within a community that may be used to generate reputation scores for files include, without limitation, information that identifies the overall health of the client device (i.e., information that identifies the performance, stability, and/or state of security of the client device), information that identifies the files stored on a client device (including information that identifies the publisher and/or signer of such files), information that identifies the impact of a file on the health of client device (e.g., information that identifies the health of the client device both before and after the file is stored on the client device), and any other information that may be used to evaluate the trustworthiness of a file. In some examples, by collecting, aggregating, and analyzing this data from potentially millions of client devices within a community (such as the user base of security-software publisher), reputation services may be able to gain a fairly accurate understanding as to the trustworthiness of a file.

As detailed above, upon identifying the trustworthiness of at least one file that was previously signed by the signer in question, the systems described herein may derive a reputation for the signer based at least in part on this information. The system described herein may perform this step in a variety of ways. In one example, reputation server 206 may assign a simple binary classification (e.g., "trusted" or "untrusted") to a particular signer based at least in part on the trustworthiness of files that were previously digitally signed by the signer. For example, reputation server 206 may designate a particular signer as "trusted" if that particular signer has never digitally signed (1) a file that was later determined to contain malware (which, as that term is used herein, may include adware, spyware, grayware, or the like) and/or (2) a file having a reputation score that fails to satisfy a predetermined threshold (e.g., a file with a reputation rating that falls below 50%).

In another example, reputation server 206 may assign a reputation score to a particular signer that attempts to convey the overall trustworthiness of files that were previously signed by this signer. For example, reputation server 206 may assign a percentage-based score to a particular signer that indicates the percentage of files signed by the signer that were later determined to be trustworthy (e.g., reputation server may assign a reputation score of "74%" to a particular signer upon determining that 74% of the files signed by this signer are trustworthy). Similarly, reputation server 206 may average the reputation scores of all files that were previously signed by a particular signer to arrive at a reputation score for that signer (e.g., reputation server may assign a reputation score of "92%" to a particular signer upon determining that the average reputation rating of all files signed by this signer equals 92%).

Returning to FIG. 3, at step 310 the systems described herein may determine whether to evaluate the trustworthiness of the file identified in step 302 based at least in part on the signer's reputation identified in step 308. For example, security module 108 in FIG. 1 may, as part of client device 202(1) in FIG. 2, determine whether to evaluate the trustworthiness of file 203(1) based at least in part on the reputation of the entity responsible for signing this file, as identified in step 308.

As detailed above, the reputation of a signer may be represented in a variety of ways and, as such, the systems described herein may perform step 310 in a variety of ways. For example, if the signer's reputation identified in step 308 represents a binary classification (e.g., "trusted" or "untrusted"), then security module 108 may determine in step 310 that an evaluation of the file identified in step 302 is unnecessary if the signer's reputation identified in step 308 indicates that the signer is trusted. Additionally or alternatively, if the signer's reputation identified in step 308 represents a reputation rating or score (conveyed, e.g., as a percentage), then reputation server 206 may determine in step 310 that an evaluation of the trustworthiness of the file identified in step 302 is necessary if the signer's reputation rating fails to satisfy a predetermined threshold (e.g., greater than 50%).

If security module 108 determines in step 310 that an evaluation of the trustworthiness of the file identified in step 302 is necessary, then security module 108 may perform (or cause to be performed) an evaluation of the trustworthiness of the file in question, even though the file has been digitally signed. For example, if security module 108 determines that the signer's reputation identified in step 310 indicates that the signer is untrusted (e.g., if a reputation designation associated with the signer indicates that the signer is "untrusted" or if a reputation rating associated with the signer falls below a predetermined threshold, such as 50%), then security module 108 may evaluate (or cause a separate module or device to evaluate) the trustworthiness of this file even though this file has been digitally signed. In some examples, security module 108 may then provide the results of such an evaluation to reputation server 206 to enable reputation server 206 to update the reputation of the signer in question. Upon completion of step 310 in FIG. 3, exemplary method 300 may terminate.

As detailed above, by determining whether to evaluate the trustworthiness of a digitally signed file based at least in part on the reputation of the signer responsible for signing such a file, the systems and methods described herein may enable security software to detect, block, and/or remove malicious and/or untrustworthy files, even if such files have been digitally signed. As such, the systems and methods described herein may enable security-software publishers to protect enterprises and end users against attacks that seek to exploit and/or compromise digital signing techniques.

Figure 6:
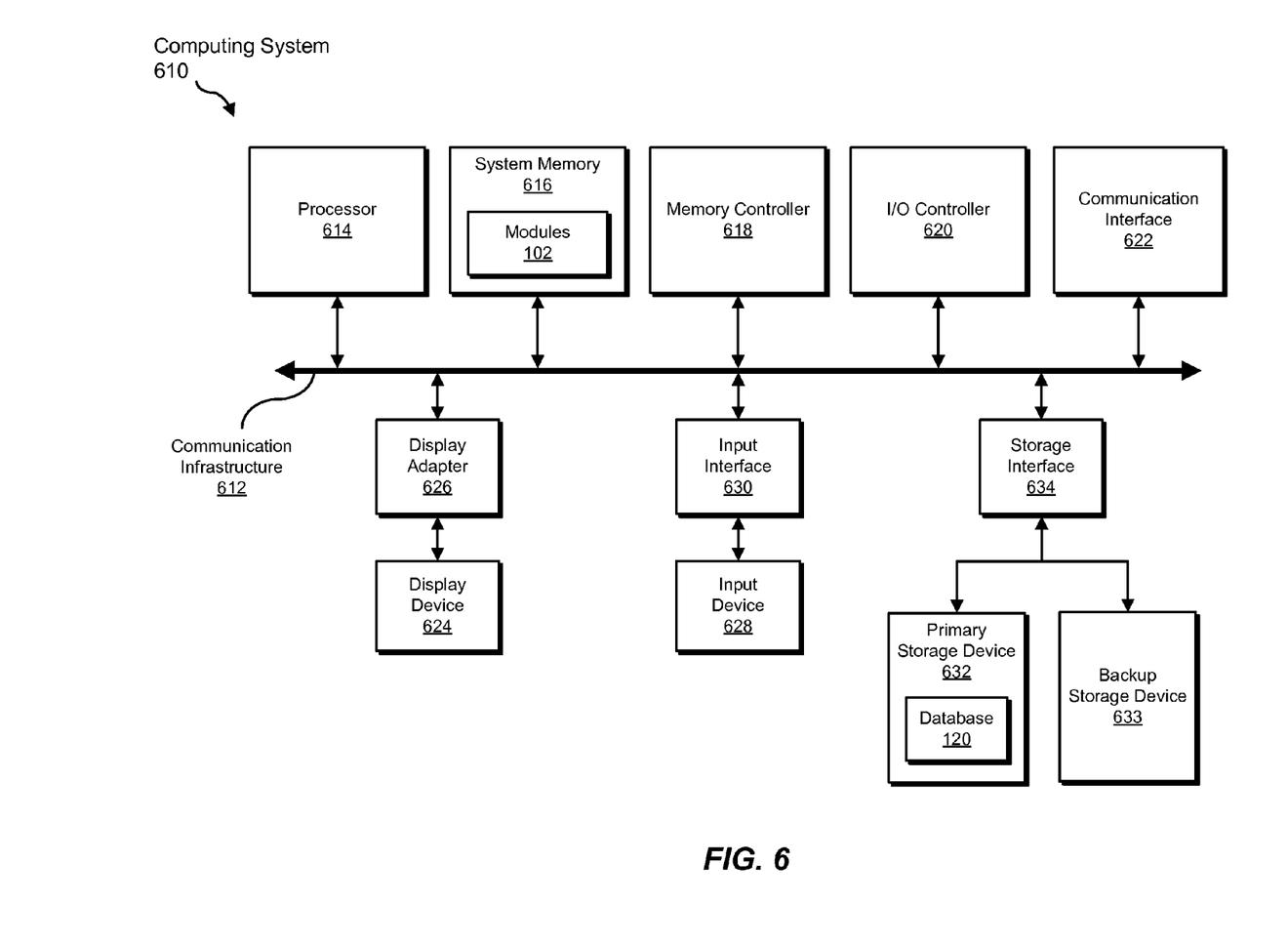
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 410 may perform and/or be a means for performing, either alone or in combination with other elements, one or more of the identifying, determining, obtaining, and evaluating steps described herein. All or a portion of computing system 410 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
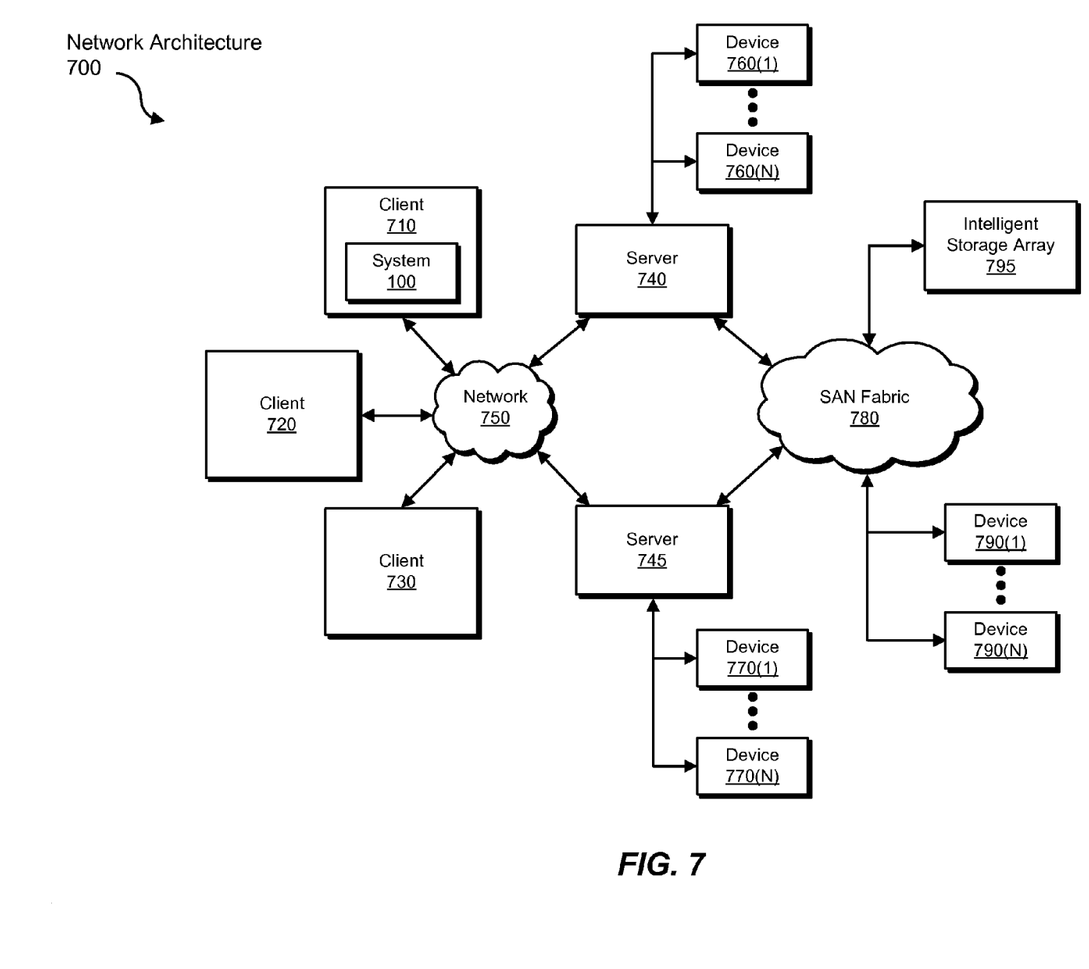
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, determining, obtaining, and evaluating steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for determining whether to evaluate the trustworthiness of digitally signed files based on signer reputation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into one that is capable of detecting, blocking, and/or removing malicious and/or untrustworthy files, even if such files have been digitally signed The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining whether to independently evaluate the trustworthiness of digitally signed files based on signer reputation, the method comprising:
   identifying a file;
   determining that the file has been digitally signed;
   identifying a signer responsible for digitally signing the file;
   identifying a reputation of the signer, the signer's reputation being based at least in part on the determined trustworthiness of at least one additional file that was previously signed by the signer;
   determining whether the signer's reputation satisfies a predetermined threshold;
   only performing an independent evaluation of the trustworthiness of the file if the signer's reputation fails to satisfy the predetermined threshold;
   wherein each step of the method is performed by a computing device comprising at least one hardware processor.

2. The method of claim 1, wherein identifying the signer's reputation comprises obtaining the signer's reputation from a reputation server.

3. The method of claim 1, wherein the signer's reputation is based at least in part on at least one of:
   whether the signer has previously signed a file containing malware;
   whether the signer has previously signed a file having a reputation that fails to satisfy a predetermined threshold.

4. The method of claim 1, wherein only performing an independent evaluation of the trustworthiness of the file if the signer's reputation fails to satisfy the predetermined threshold comprises determining that an independent evaluation of the trustworthiness of the file is unnecessary in response to at least one of:
   determining that the signer's reputation indicates that the signer is classified as trusted;
   determining that the signer's reputation satisfies a predetermined reputation-score threshold.

5. The method of claim 1, wherein only performing an independent evaluation of the trustworthiness of the file if the signer's reputation fails to satisfy the predetermined threshold comprises:
- determining, based at least in part on a determination that the signer's reputation fails to satisfy the predetermined threshold, that an independent evaluation of the trustworthiness of the file is necessary; or
- determining, based at least in part on a determination that the signer's reputation satisfies the predetermined threshold, that an independent evaluation of the trustworthiness of the file is unnecessary.

6. The method of claim 1, wherein the computing device comprises at least one of:
- a server-side computing device;
- a client-side computing device.

7. The method of claim 1, further comprising:
- identifying the additional file that was previously signed by the signer;
- determining the trustworthiness of the additional file;
- deriving the signer's reputation based at least in part on the trustworthiness of the additional file.

8. The method of claim 1, wherein identifying the reputation of the signer comprises at least one of:
- identifying a binary classification assigned to the signer;
- identifying a reputation score assigned to the signer.

9. A system for determining whether to independently evaluate the trustworthiness of digitally signed files based on signer reputation, the system comprising:
- a file-analysis module programmed to:
  - identify a file;
  - determine that the file has been digitally signed;
  - identify a signer responsible for digitally signing the file;
- a reputation module programmed to identify a reputation of the signer, the signer's reputation being based at least in part on the determined trustworthiness of at least one additional file that was previously signed by the signer;
- a security module programmed to:
  - determine whether the signer's reputation satisfies a predetermined threshold;
  - only perform an independent evaluation of the trustworthiness of the file if the signer's reputation fails to satisfy the predetermined threshold;
- at least one processor configured to execute the file-analysis module, the reputation module, and the security module.

10. The system of claim 9, wherein the reputation module identifies the signer's reputation by obtaining the signer's reputation from a reputation server.

11. The system of claim 9, wherein the signer's reputation is based at least in part on at least one of:
- whether the signer has previously signed a file containing malware;
- whether the signer has previously signed a file having a reputation that fails to satisfy a predetermined threshold.

12. The system of claim 9, wherein the security module is further programmed to determine that an independent evaluation of the trustworthiness of the file is unnecessary in response to at least one of:
- determining that the signer's reputation indicates that the signer is classified as trusted;
- determining that the signer's reputation satisfies a predetermined reputation-score threshold.

13. The system of claim 9, wherein the security module is further programmed to:
- determine, based at least in part on a determination that the signer's reputation fails to satisfy the predetermined threshold, that an independent evaluation of the trustworthiness of the file is necessary; or
- determine, based at least in part on a determination that the signer's reputation satisfies the predetermined threshold, that an independent evaluation of the trustworthiness of the file is unnecessary.

14. The system of claim 9, further comprising at least one of:
- a server-side computing device comprising at least one processor configured to execute at least one of the file-analysis module, the reputation module, and the security module;
- a client-side computing device comprising at least one processor configured to execute at least one of the file-analysis module, the reputation module, and the security module.

15. A non-transitory computer-readable-storage medium comprising one or more computer-executable instructions that, when executed by at least one processor of a computing device, cause the computing device to:
- identify a file;
- determine that the file has been digitally signed;
- identify a signer responsible for digitally signing the file;
- identify a reputation of the signer, the signer's reputation being based at least in part on the determined trustworthiness of at least one additional file that was previously signed by the signer;
- determine whether the signer's reputation satisfies a predetermined threshold;
- only perform an independent evaluation of the trustworthiness of the file if the signer's reputation fails to satisfy the predetermined threshold.

16. The computer-readable-storage medium of claim 15, wherein the computing device identifies the signer's reputation by obtaining the signer's reputation from a reputation server.

17. The computer-readable-storage medium of claim 15, wherein the signer's reputation is based at least in part on at least one of:
- whether the signer has previously signed a file containing malware;
- whether the signer has previously signed a file having a reputation that fails to satisfy a predetermined threshold.

18. The computer-readable-storage medium of claim 15, wherein the computing device:
- determines, based at least in part on a determination that the signer's reputation fails to satisfy the predetermined threshold, that an independent evaluation of the trustworthiness of the file is necessary; or
- determines, based at least in part on a determination that the signer's reputation satisfies the predetermined threshold, that an independent evaluation of the trustworthiness of the file is unnecessary.

19. The computer-readable-storage medium of claim 15, wherein the computing device determines that an independent evaluation of the trustworthiness of the file is unnecessary in response to at least one of:
- determining that the signer's reputation indicates that the signer is classified as trusted;
- determining that the signer's reputation satisfies a predetermined reputation-score threshold.

* * * * *